United States Patent
Lee

(10) Patent No.: US 11,494,106 B2
(45) Date of Patent: Nov. 8, 2022

(54) MEMORY CONTROLLER AND METHOD OF ORDERING SEQUENTIAL DATA AND RANDOM DATA

(71) Applicant: SK hynix Inc., Icheon-si (KR)

(72) Inventor: Ji Hoon Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/183,899

(22) Filed: Feb. 24, 2021

(65) Prior Publication Data

US 2022/0057953 A1 Feb. 24, 2022

(30) Foreign Application Priority Data

Aug. 18, 2020 (KR) .................. 10-2020-0103386

(51) Int. Cl.
*G06F 3/06* (2006.01)

(52) U.S. Cl.
CPC .......... *G06F 3/0647* (2013.01); *G06F 3/0611* (2013.01); *G06F 3/0679* (2013.01)

(58) Field of Classification Search
CPC .......... G06F 3/0647; G06F 2212/7201; G06F 2212/7205
See application file for complete search history.

(56) References Cited

U.S. PATENT DOCUMENTS

| | | | | |
|---|---|---|---|---|
| 7,401,193 B1 * | 7/2008 | Ye | ........................ | G06F 11/2087 714/6.23 |
| 8,316,176 B1 * | 11/2012 | Phan | .................. | G06F 12/0246 365/185.33 |
| 8,843,712 B1 * | 9/2014 | Smith | ................. | G06F 11/3419 711/159 |
| 2009/0113121 A1 * | 4/2009 | Lee | ..................... | G06F 12/0246 711/E12.001 |
| 2017/0123972 A1 | 5/2017 | Gopinath et al. | | |
| 2019/0171559 A1 * | 6/2019 | Lee | ..................... | G06F 12/0253 |
| 2021/0141532 A1 | 5/2021 | Byun | | |
| 2021/0271757 A1 | 9/2021 | Horspool et al. | | |

FOREIGN PATENT DOCUMENTS

| | | |
|---|---|---|
| KR | 10-2053865 B1 | 9/2014 |
| KR | 10-2017-0140467 A | 12/2017 |
| KR | 10-2018-0119470 A | 11/2018 |
| KR | 10-2020-0014175 A | 2/2020 |

OTHER PUBLICATIONS

Notice of Allowance of U.S. Appl. No. 17/204,317 from the USPTO dated Mar. 18, 2022.

\* cited by examiner

*Primary Examiner* — Chie Yew

(57) ABSTRACT

A memory controller includes a meta data memory configured to store mapping information of data stored in a plurality of memory blocks included in a memory device and valid data information indicating whether the data stored in the plurality of memory blocks is valid data, and a migration controller configured to control the memory device to perform a migration operation of moving a plurality of valid data stored in a source memory block among the plurality of memory blocks from the source memory block to a target memory block based on the mapping information and the valid data information.

15 Claims, 14 Drawing Sheets

FIG. 5

| LBA | PBA | Valid |
|-----|-----|-------|
| LBA1 | PBA1 | Valid |
| LBA2 | PBA2 | Valid |
| LBA3 | PBA3 | Valid |
| LBA4 | PBA4 | Invalid |
| LBA5 | PBA5 | Valid |
| LBA6 | PBA6 | Invalid |
| LBA7 | PBA7 | Valid |
| ⋮ | ⋮ | ⋮ |

MDATA

MEMORY CONTROLLER AND METHOD OF ORDERING SEQUENTIAL DATA AND RANDOM DATA

CROSS-REFERENCE TO RELATED APPLICATION

The present application claims priority under 35 U.S.C. § 119(a) to Korean patent application number 10-2020-0103386 filed on Aug. 18, 2020, in the Korean Intellectual Property Office, the entire disclosure of which is incorporated by reference herein.

BACKGROUND

1. Technical Field

The present disclosure relates to an electronic device, and more particularly, to a memory controller and a method of operating the same.

2. Related Art

A storage device is a device that stores data under control of a host. The storage device may include a memory device storing data and a memory controller controlling the memory device. A memory device may be classified into a volatile memory device and a non-volatile memory device.

A volatile memory device may store data only while receiving power from a power source. When the power supply is cut off, the data stored in the volatile memory device may be lost. Examples of a volatile memory device may include a static random access memory (SRAM), a dynamic random access memory (DRAM), and the like.

A non-volatile memory device may be a device in which the data is not lost even though power from the power source is cut off. Examples of a non-volatile memory device may include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory controller that improves a speed of reading valid data having successive logical addresses.

A memory controller according to an embodiment of the present disclosure is a memory controller that controls a memory device including a plurality of memory blocks. The memory controller may include a meta data memory configured to store mapping information of a data stored in the plurality of memory blocks and valid data information indicating whether the data stored in the plurality of memory blocks is valid data, and a migration controller configured to control the memory device to perform a migration operation of moving a plurality of valid data stored in a source memory block to a target memory block based on the mapping information and the valid data information. A sequential data, which is a valid data having successive logical addresses among the plurality of valid data stored in the source memory block, is stored in the target memory block to be simultaneously read in the target memory block.

A method of operating a memory controller according to another embodiment of the present disclosure is a method of operating a memory controller that controls a memory device including a plurality of memory blocks. The method may include providing a read command for a sequential data and a random data stored in a source memory block among the plurality of memory blocks to the memory device based on mapping information of a data stored in the plurality of memory blocks and valid data information indicating whether the data stored in the plurality of memory blocks is a valid data, providing a sequential write command for the sequential data to the memory device in response to completion of all first read operations on the sequential data, and providing a random write command for the random data to the memory device in an order in which a second read operation on the random data is completed. The sequential write command is a command for instructing storing the sequential data in a target memory block among the plurality of memory blocks so that the sequential data is simultaneously read in the target memory block.

According to the present technology, a memory controller that improves a speed of reading valid data having successive logical addresses is provided.

BRIEF DESCRIPTION OF THE DRAWINGS

FIG. 5 is a diagram illustrating meta data stored in a meta data memory according to an embodiment of the present disclosure.

DETAILED DESCRIPTION

Specific structural or functional descriptions of embodiments according to the concepts which are disclosed in the present specification or application are illustrated only to describe the embodiments according to the concepts of the present disclosure. The embodiments according to the concepts of the present disclosure may be carried out in various forms and the descriptions are not limited to the embodiments described in the present specification or application.

Figure 1:
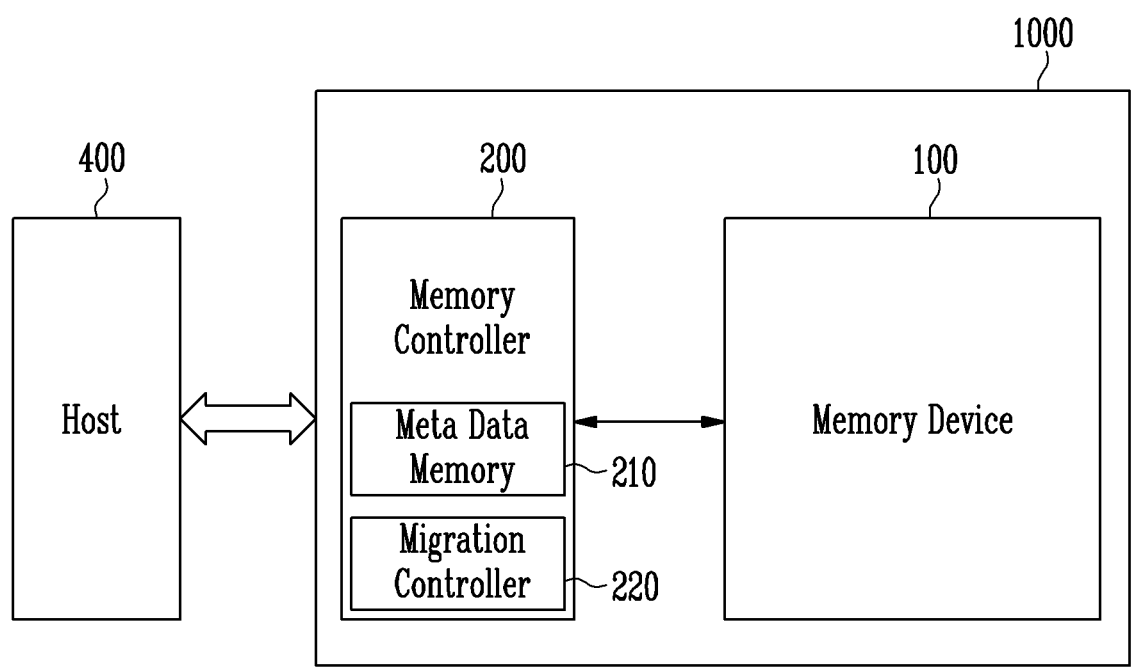
FIG. 1 is a diagram illustrating a storage system according to an embodiment of the present disclosure.

FIG. 1 is a diagram illustrating a storage system according to an embodiment of the present disclosure.

Referring to FIG. 1, a storage system may be implemented as a personal computer (PC), a data center, a corporate data storage system, a data processing system including a direct attached storage (DAS), a data processing system including a storage area network (SAN), and a data processing system including a network attached storage (NAS), or the like.

The storage system may include a storage device 1000 and a host 400.

The storage device 1000 may be a device that stores data according to a request of the host 400, such as a cellular phone, a smartphone, an MP3 player, a laptop computer, a desktop computer, a game player, a TV, a tablet PC, or an in-vehicle infotainment system.

The storage device 1000 may be manufactured as one of various types of storage devices according to a host interface that is a communication method with the host 400. For example, the storage device 1000 may be configured as any one of various types of storage devices such as a solid state drive (SSD), a multimedia card in a form of an MMC, an embedded MMC (eMMC), a Reduced-Size MMC (RS-MMC) and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 1000 may be manufactured as any one of various types of packages. For example, the storage device 1000 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The storage device 1000 may include a memory device 100 and a memory controller 200.

The memory device 100 may operate in response to control of the memory controller 200. Specifically, the memory device 100 may receive a command and an address from the memory controller 200 and access a memory cell selected by the address from among memory cells in the memory device (not shown). The memory device 100 may perform an operation instructed by the command on the memory cell selected by the address.

The command may be, for example, a program command, a read command, or an erase command, and the operation instructed by the command may be, for example, a program operation (or a write operation), a read operation, or an erase operation.

For example, the memory device 100 may receive the program command, an address, and data, and program the data in a memory cell selected by the address. Here, data to be programmed in the selected memory cell may be defined as write data.

For example, the memory device 100 may receive the read command and an address, and read data in the memory cell array from an area selected by the address (not shown). Data to be read from the selected area, from among data stored in the memory device 100, may be defined as read data.

For example, the memory device 100 may receive the erase command and an address, and erase data from the memory device 100 that is stored in an area selected by the address.

For example, the memory device 100 may be implemented with a double data rate synchronous dynamic random access memory (DDR SDRAM), a low power double data rate4 (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory, a spin transfer torque random access memory (STT-RAM), or the like.

In the present specification, for convenience of description, it is assumed that the memory device 100 is a NAND flash memory.

The memory device 100 may store the write data under control of the memory controller 200, or read the stored read data and provide the read data to the memory controller 200.

The memory device 100 may include at least one plane. One plane may include a memory cell array (not shown) that includes memory cells storing data.

The memory cell array may include a plurality of memory blocks (not shown). A memory block may be a unit that performs an erase operation of erasing data.

The memory block may include a plurality of pages (not shown). A page may be a unit that performs the program operation of storing the write data or the read operation of reading the stored read data.

The memory controller 200 may control an overall operation of the storage device 1000.

When power is applied to the storage device 1000, the memory controller 200 may execute firmware. When the memory device 100 is a flash memory device, the firmware may include a host interface layer, a flash translation layer, and a flash interface layer.

The host interface layer may control an operation between the host 400 and the memory controller 200.

The flash translation layer may convert a logical address provided from the host 400 into a physical address. To this end, the memory controller 200 may store map data that is a correspondence relationship between the logical address and the physical address.

The flash interface layer may control communication between the memory controller 200 and the memory device 100.

The memory controller 200 may control the memory device 100 to perform the program operation, the read operation, and the erase operation in response, respectively, to a write request, a read request, and an erase request of the host 400.

During the program operation, the memory controller 200 may provide the program command, the physical address, and the write data to the memory device 100.

During the read operation, the memory controller 200 may provide the read command and the physical address to the memory device 100.

In the erase operation, the memory controller 200 may provide the erase command and the physical address to the memory device 100.

The memory controller 200 may generate a command, an address, and data autonomously regardless of, or independent of, a request provided from the host 400. The memory controller 200 may transmit the autonomously generated command, address, and data to the memory device 100.

For example, the memory controller 200 may generate a command, an address, and data for performing a background operation. In addition, the memory controller 200 may provide the command, the address, and the data to the memory device 100.

The background operation may be at least one of wear leveling, read reclaim, and garbage collection.

The wear leveling may mean, for example, static wear leveling, dynamic wear leveling, and the like. The static wear leveling may mean an operation of storing the number of times memory blocks are erased and moving cold data, which hardly or rarely is involved in an erase operation or a write operation, to a memory block having the largest or a larger number of erase times. The dynamic wear leveling may mean an operation of storing the number of times memory blocks are erased and programming data in a memory block having the least or fewer number of erase times.

The read reclaim may mean an operation of moving data stored in a memory block to another memory block before an uncorrectable error occurs in data stored in the memory block.

The garbage collection may mean an operation of copying valid data included in a bad block from among memory blocks to a free block, and erasing invalid data included in the bad block. Here, copying the valid data included in the bad block to the free block may have the same meaning as moving the valid data included in the bad block to the free block.

As described above, in the background operation, a migration operation of moving valid data stored in a specific memory block to another memory block may be performed. That is, when the background operation is required to be performed, the memory controller 200 may perform the migration operation.

The memory controller 200 may include a meta data memory 210 and a migration controller 220.

The meta data memory 210 may store meta data for data stored in the plurality of memory blocks. The meta data may include, for example, mapping information and valid data information of the data stored in the plurality of memory blocks.

The mapping information may be information defining a mapping relationship between a logical address provided from the host 400 and a physical address of the memory block.

The valid data information may be information indicating whether the data stored in the plurality of memory blocks is valid data.

The migration controller 220 may check validity of data stored in a source memory block from among the plurality of memory blocks based on the valid data information.

In an embodiment, the source memory block may be a memory block in which cold data is stored in a static wear leveling operation.

In an embodiment, the source memory block may be a memory block having the largest number of erase times in a dynamic wear leveling operation.

In an embodiment, the source memory block may be a memory block in which data is stored before the data is moved in a read reclaim operation.

In an embodiment, the source memory block may be a victim block (or bad block) in a garbage collection operation.

The migration controller 220 may perform a migration operation of moving a plurality of valid data stored in the source memory block from the source memory block to a target memory block based on the mapping information.

In an embodiment, the target memory block may be a memory block having the largest number of erase times in the static wear leveling operation.

In an embodiment, the target memory block may be a memory block having the least number of erase times in the dynamic wear leveling operation.

In an embodiment, the target memory block may be another memory block to which the data stored in a source memory block is to be moved in the read reclaim operation.

In an embodiment, the target memory block may be a free block in the garbage collection operation.

The plurality of valid data stored in the source memory block may be sequential data or random data.

The sequential data may be valid data having successive logical addresses among the plurality of valid data stored in the source memory block.

In an embodiment, the sequential data may be stored in the target memory block so as to be simultaneously read in the target memory block.

The random data may be valid data having non-successive logical address among the plurality of valid data stored in the source memory block. Alternatively, the random data may be valid data except for the sequential data, from among the plurality of valid data stored in the source memory block.

In an embodiment, the migration controller 220 may control the memory device 100 to read the sequential data and the random data. Specifically, the migration controller 220 may control the memory device 100 to perform a first read operation on the sequential data and control the memory device 100 to perform a second read operation on the random data.

In an embodiment, when all first read operations are completed, the migration controller 220 may control the memory device 100 to store the sequential data in the target memory block.

In an embodiment, the migration controller 220 may control the memory device 100 to store the random data in the target memory block in an order in which the second read operation is completed.

The memory controller 200 may provide a response to the request provided by the host 400, to the host 400 and may wait until a subsequent request, to be provided by the host 400, is received after the response is provided. In this case, the migration controller 220 may control the memory device 100 to perform the migration operation within a corresponding period from after the response is provided to the host 400 until the subsequent request is received.

The memory controller 200 may control two or more memory devices 100. In an example, the memory controller 200 may control the memory devices 100 according to an interleaving method to improve operation performance.

The interleaving method may be a method of controlling operations of two or more memory devices 100 in an overlapping manner.

Although not shown, the storage device 1000 may further include a buffer memory. For example, the buffer memory may be implemented with any one of a double data rate synchronous dynamic random access memory (DDR SDRAM), a low power double data rate4 (LPDDR4) SDRAM, a graphics double data rate (GDDR) SDRAM, a low power DDR (LPDDR) SDRAM, a Rambus dynamic random access memory (RDRAM), a resistive random access memory (RRAM), a phase-change random access memory (PRAM), a magnetoresistive random access memory (MRAM), a ferroelectric random access memory, and a spin transfer torque random access memory (STT-RAM).

The host 400 may communicate with the storage device 1000 through an interface (not shown).

The interface may be implemented with a serial advanced technology attachment (SATA) interface, a SATA express (SATA express) interface, a serial attached small computer system (SAS) interface, a peripheral component interconnect express (PCIe) interface, a non-volatile memory express (NVMe) interface, an advanced host controller interface (AHCI), or a multimedia card interface, as non-limiting examples.

The host 400 may communicate with the storage device 1000 to store the write data in the storage device 1000 or to obtain the read data stored in the storage device 1000.

In an embodiment, the host 400 may provide the write request to the storage device 1000 for requesting to store the write data in the storage device 1000. In addition, the host 400 may provide the write request, the write data, and a logical address for identifying the write data to the storage device 1000.

The storage device 1000 may store the write data provided by the host 400 in the memory device 100 in response to the write request provided from the host 400. The storage device 1000 may provide a response that the storage is completed to the host 400.

In an embodiment, the host 400 may provide the read request to the storage device 1000 for requesting to provide the data stored in the storage device 1000 to the host 400. In addition, the host 400 may provide a read request and a read address to the storage device 1000.

The storage device 1000 may read the read data corresponding to the read address provided by the host 400 from the memory device 100 in response to the read request provided from the host 400. The storage device 1000 may provide the read data to the host 400 as a response to the read request.

Figure 2:
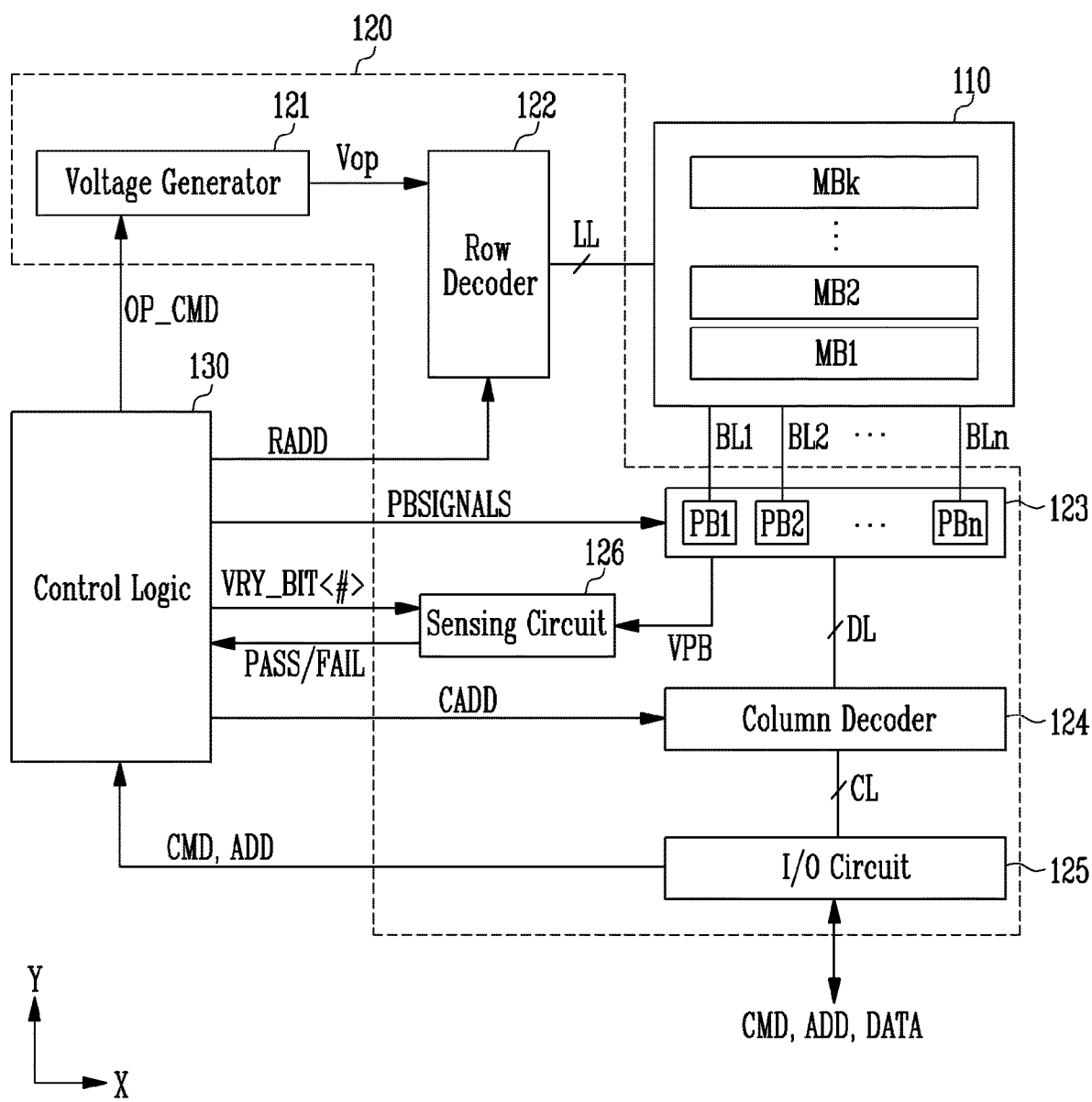
FIG. 2 is a diagram illustrating a memory device according to an embodiment of the present disclosure.

FIG. 2 is a diagram illustrating a memory device according to an embodiment of the present disclosure.

Referring to FIGS. 1 and 2, the memory device 100 may include a memory cell array 110, a peripheral circuit 120, and a control logic 130.

The memory cell array 110 may include a plurality of memory blocks MB1 to MBk (where k is a positive integer). Here, the number of the plurality of memory blocks MB1 to MBk is only an example for describing embodiments of the present disclosure, but is not limited thereto.

Each of the memory blocks MB1 to MBk may be connected to local lines LL and bit lines BL1 to BLn (where n is a positive integer).

The local lines LL may be connected to a row decoder 122.

The local lines LL may be connected to each of the memory blocks MB1 to MBk.

Although not shown, the local lines LL may include a first select line, a second select line, and a plurality of word lines arranged between the first select line and the second select line.

Although not shown, the local lines LL may further include dummy lines arranged between the first select line and the word lines, dummy lines arranged between the second select line and the word lines, and pipelines.

The bit lines BL1 to BLn may be commonly connected to the memory blocks MB1 to MBk.

The memory blocks MB1 to MBk may be implemented as a two-dimensional or three-dimensional structure.

For example, in the memory blocks MB1 to MBk of the two-dimensional structure, memory cells may be arranged in a direction parallel to a substrate.

For example, in the memory blocks MB1 to MBk of the three-dimensional structure, memory cells may be stacked on a substrate in a vertical direction.

The peripheral circuit 120 may include a voltage generator 121, the row decoder 122, a page buffer group 123, a column decoder 124, an input/output circuit (I/O circuit) 125, and a sensing circuit 126.

The voltage generator 121 may generate various operation voltages Vop used for the program operation, the read operation, and the erase operation in response to an operation command OP_CMD. In addition, the voltage generator 121 may selectively discharge the local lines LL in response to the operation command OP_CMD. For example, the voltage generator 121 may generate a program voltage, a verify voltage, pass voltages, a turn-on voltage, a read voltage, an erase voltage, a source line voltage, and the like under control of the control logic 130.

In an embodiment, the voltage generator 121 may regulate an external power voltage to generate an internal power voltage. The internal power voltage generated by the voltage generator 121 may be used as an operation voltage of the memory device 100.

In an embodiment, the voltage generator 121 may generate a plurality of voltages using an external power voltage or an internal power voltage. For example, the voltage generator 121 may include a plurality of pumping capacitors that receive the internal power voltage, and may generate the plurality of voltages by selectively activating the plurality of pumping capacitors in response to the control of the control logic 130. The plurality of generated voltages may be supplied to the memory cell array 110 by the row decoder 122.

The row decoder 122 may transfer the operation voltages Vop to the local lines LL in response to a row address RADD. The operation voltages Vop may be transferred to selected memory blocks MB1 to MBk through the local lines LL.

For example, during the program operation, the row decoder 122 may apply the program voltage to selected word lines and a program pass voltage of a level less than that of the program voltage to unselected word lines. During the program verify operation, the row decoder 122 may apply the verify voltage to the selected word line and a verify pass voltage greater than the verify voltage to the unselected word lines.

During the read operation, the row decoder 122 may apply the read voltage to the selected word line, and apply a read pass voltage greater than the read voltage to the unselected word lines.

During the erase operation, the row decoder 122 may select one memory block according to a decoded address. During the erase operation, the row decoder 122 may apply a ground voltage to word lines connected to the selected memory block.

The page buffer group 123 may include first to n-th page buffers PB1 to PBn (where n is a positive integer). The first to n-th page buffers PB1 to PBn may be connected to the memory cell array 110 through the first to n-th bit lines BL1 to BLn, respectively. The first to n-th page buffers PB1 to PBn may operate in response to the control of the control logic 130.

Specifically, the first to n-th page buffers PB1 to PBn may operate in response to page buffer control signals PBSIG-NALS. For example, the first to n-th page buffers PB1 to PBn may temporarily store data received through the first to n-th bit lines BL1 to BLn, or may sense a voltage or a current of the bit lines BL1 to BLn during the read operation or the verify operation.

During the program operation, when the program voltage is applied to the selected word line, the first to n-th page buffers PB1 to PBn may transfer data DATA received through the column decoder 124 and the input/output circuit 125 to the selected memory cell through the first to n-th bit lines BL1 to BLn.

The memory cells of the selected page are programmed according to the transferred data DATA. The memory cell connected to the bit line to which a program permission voltage (for example, a ground voltage) is applied may have an increased threshold voltage. The threshold voltage of the memory cell connected to the bit line to which a program inhibit voltage (for example, a power voltage) is applied may be maintained.

During the verify operation, the first to n-th page buffers PB1 to PBn may sense data stored in the memory cells selected through the first to n-th bit lines BL1 to BLn from the selected memory cells.

During the read operation, the first to n-th page buffers PB1 to PBn may sense the data DATA from the memory cells of the selected page through the first to n-th bit lines BL1 to BLn, and output the read data DATA to the input/output circuit 125 under the control of the column decoder 124.

During the erase operation, the first to n-th page buffers PB1 to PBn may float the first to n-th bit lines BL1 to BLn.

The column decoder 124 may transfer data between the input/output circuit 125 and the page buffer group 123 in response to a column address CADD. For example, the column decoder 124 may exchange data with the page buffers PB1 to PBn through data lines DL, or may exchange data with the input/output circuit 125 through column lines CL.

The input/output circuit 125 may transfer the command CMD and the address ADD received from the memory controller 200 to the control logic 130, or may exchange data DATA with the column decoder 124.

During the read operation or the verify operation, the sensing circuit 126 may generate a reference current in response to a permission bit signal VRY_BIT<#> and compare a sensing voltage VPB received from the page buffer group 123 with a reference voltage generated by the reference current to output a pass signal PASS or a fail signal FAIL.

The control logic 130 may output the operation command OP_CMD, the row address RADD, the page buffer control signals PBSIGNALS, and the permission bit signal VRY_BIT<#>, in response to the command CMD and the address ADD, to control the peripheral circuit 120.

Figure 3:
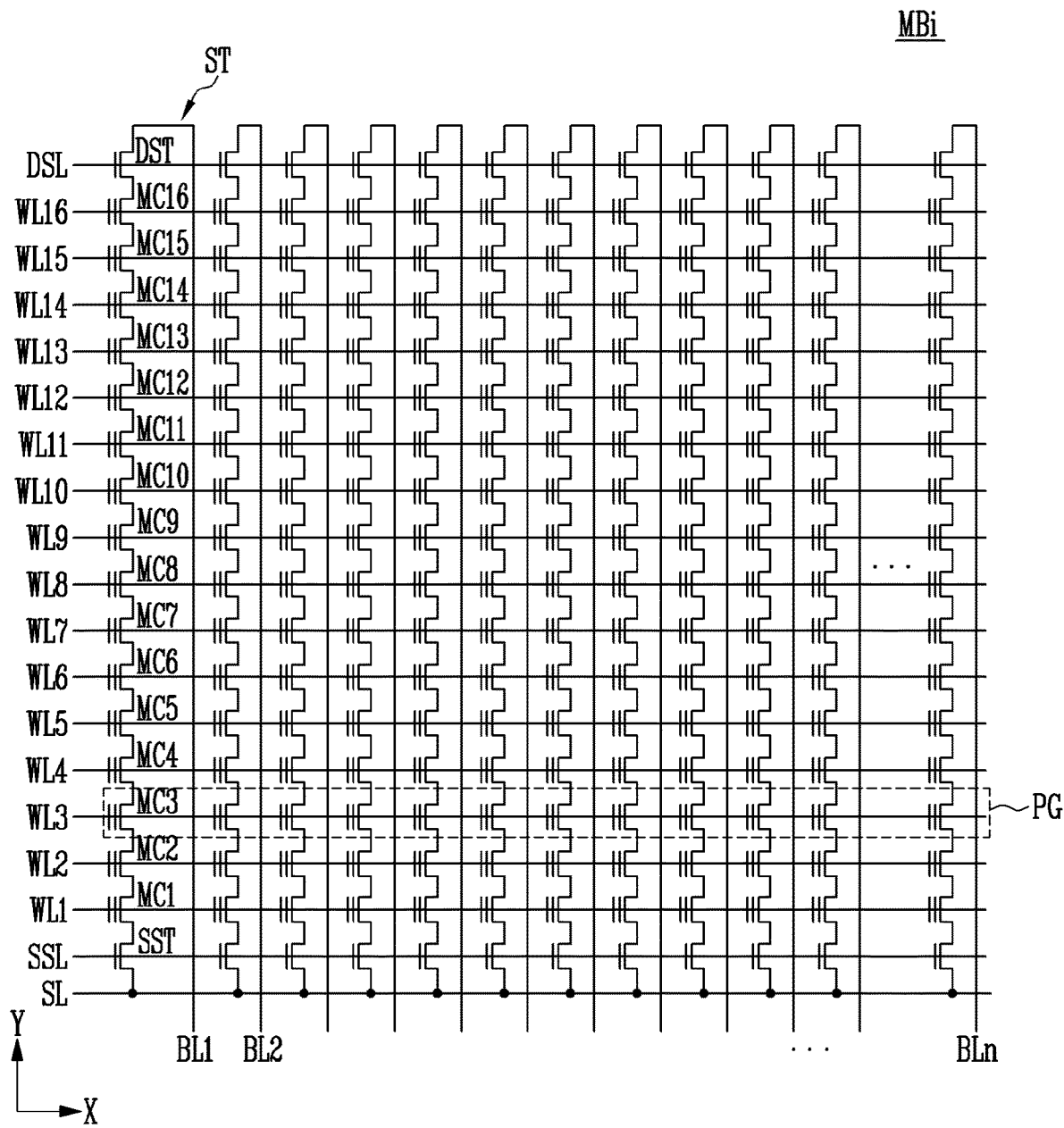
FIG. 3 is a diagram illustrating a structure of any one of a plurality of memory blocks shown in FIG. 2.

FIG. 3 is a diagram illustrating a structure of any one of the plurality of memory blocks shown in FIG. 2.

Referring to FIG. 3, a memory block MBi shown in FIG. 3 may be any one of the memory blocks MB1 to MBk of FIG. 2.

The memory block MBi may include a first select line, a second select line, a plurality of word lines WL1 to WL16, a source line SL, a plurality of bit lines BL1 to BLn, and a plurality of strings ST.

The first select line may be, for example, a source select line SSL. Hereinafter, it is assumed that the first select line is the source select line SSL.

The second select line may be, for example, a drain select line DSL. Hereinafter, it is assumed that the second select line is the drain select line DSL.

The plurality of word lines WL1 to WL16 may be arranged in parallel between the source select line SSL and the drain select line DSL.

The number of word lines WL1 to WL16 shown in FIG. 3 is only an example, and the number of word lines in a string ST is not limited to the number illustrated in the drawings.

The source line SL may be commonly connected to the plurality of strings ST.

The plurality of bit lines BL1 to BLn may be connected to the strings ST, respectively.

The plurality of strings ST may be connected respectively to the bit lines BL1 to BLn and may be connected to the source line SL.

In FIG. 3, the string ST connected to the first bit line BL1 is illustrated as an example, and other strings in the memory block may be configured in an identical or substantially identical manner.

The string ST may include a plurality of memory cells MC1 to MC16, at least one first select transistor, and at least one second select transistor.

The plurality of memory cells MC1 to MC16 may be connected in series between a source select transistor SST and a drain select transistor DST.

Gates of the memory cells MC1 to MC16 may be connected to the plurality of word lines WL1 to WL16, respectively. Therefore, the number of memory cells MC1 to MC16 included in one string ST may be the same as the number of word lines WL1 to WL16.

Any one of the plurality of memory cells MC1 to MC16 may be configured of any one of a single-level cell (SLC), a multi-level cell (MLC), a triple-level cell (TLC), and a quad-level cell (QLC).

A group of memory cells connected to the same word line among memory cells included in different strings ST may be referred to as a physical page PG. Therefore, the memory block MBi may include the physical pages PG corresponding to the number of word lines WL1 to WL16. Hereinafter, it is assumed that memory cells (for example, MC3) included in a physical page PG are selected memory cells.

The first select transistor may be, for example, a source select transistor SST. Hereinafter, it is assumed that the first select transistor is the source select transistor SST.

A first electrode of the source select transistor SST may be connected to the source line SL. A second electrode of the source select transistor SST may be connected to the first memory cell MC1 from among the plurality of memory cells MC1 to MC16. A gate electrode of the source select transistor SST may be connected to the source select line SSL.

The second select transistor may be, for example, a drain select transistor DST. Hereinafter, it is assumed that the second select transistor is the drain select transistor DST.

A first electrode of the drain select transistor DST may be connected to the sixteenth memory cell MC16 from among the plurality of memory cells MC1 to MC16. A second electrode of the drain select transistor DST may be connected to the first bit line BL1. A gate electrode of the drain select transistor DST may be connected to the drain select line DSL.

Figure 4:
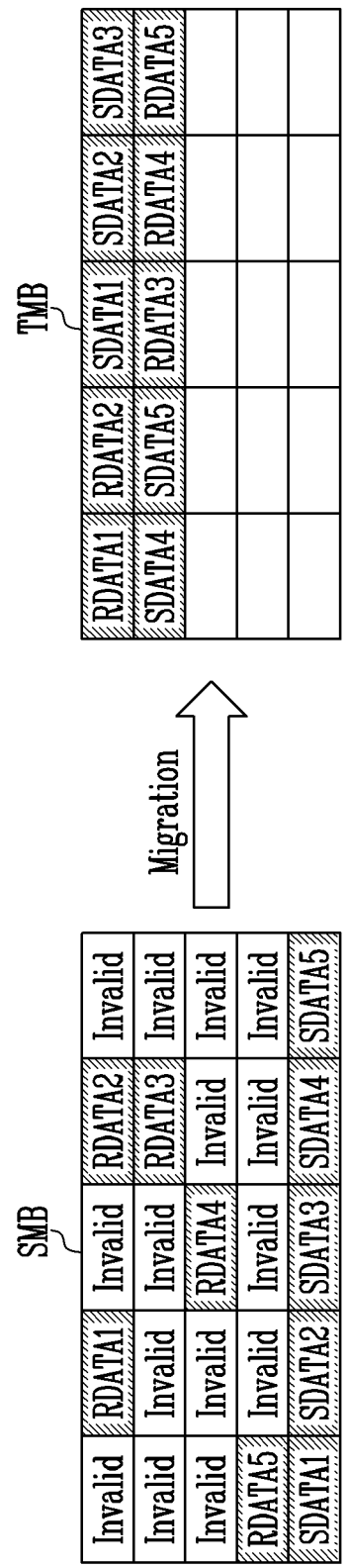
FIG. 4 is a diagram illustrating a migration operation according to an embodiment of the present disclosure.

FIG. 4 is a diagram illustrating a migration operation according to an embodiment of the present disclosure.

Referring to FIG. 4, the source memory block SMB may store a plurality of valid data RDATA1 to RDATA5 and SDATA1 to SDATA5 and a plurality of invalid data Invalid. Whether the data stored in the source memory block SMB is valid data or invalid data Invalid may be checked using the meta data stored in the meta data memory 210, for example, the valid data information of the data stored in the memory block.

The plurality of valid data RDATA1 to RDATA5 and SDATA1 to SDATA5 stored in the source memory block SMB may be divided into a plurality of sequential data SDATA1 to SDATA5 and a plurality of random data RDATA1 to RDATA5. Whether the plurality of valid data stored in the source memory block SMB is the sequential data or the random data may be checked using the meta data stored in the meta data memory 210, such as the mapping information.

Although FIG. 4 illustrates a defined number of each of the sequential data SDATA1 to SDATA5 and the random data RDATA1 to RDATA5, embodiments contemplated by the present disclosure are not limited thereto. Hereinafter, for convenience of description, it is assumed that the sequential data and the random data are the sequential data SDATA1 to SDATA5 and the random data RDATA1 to RDATA5 shown in FIG. 4.

In contrast to the plurality of random data RDATA1 to RDATA5, all of the plurality of sequential data SDATA1 to SDATA5 is provided to the host 400 in response to the read request from the host 400. Therefore, the plurality of sequential data SDATA1 to SDATA5 may be stored in successive physical addresses mapped to the successive logical addresses from among the physical addresses of the source memory block SMB. In this case, a read operation on the plurality of sequential data SDATA1 to SDATA5 may be performed more quickly.

As described above, the erase operation is performed in a memory block unit, so the migration operation may be performed in order to erase the invalid data Invalid stored in the source memory block SMB. Here, the migration operation may refer to an operation of moving the plurality of valid data RDATA1 to RDATA5 and SDATA1 to SDATA5, which is stored in the source memory block SMB, from the source memory block SMB to the target memory block TMB.

In an embodiment, the source memory block SMB may be a victim block selected during the garbage collection operation from among the plurality of memory blocks. In addition, the target memory block TMB may be a free block among the plurality of memory blocks.

In an embodiment, the victim block may be a memory block in which the sequential data SDATA1 to SDATA5, having a size less than or equal to a preset reference size, are stored. That is, when the garbage collection operation is performed, the migration controller 220 may select a memory block storing the sequential data SDATA1 to SDATA5 having a size less than or equal to the reference size from among the plurality of memory blocks as the victim block. Here, the reference size may be set in advance through an experiment, design, or the like before shipment, but the reference size is not limited thereto and may be updated after the shipment.

The plurality of sequential data SDATA1 to SDATA5 may be stored in the target memory block TMB when all first read operations on the plurality of sequential data SDATA1 to SDATA5 are completed. The plurality of random data RDATA1 to RDATA5 may be stored in the target memory block TMB in an order in which the plurality of random data RDATA1 to RDATA5 are obtained by the second read operation on the plurality of random data RDATA1 to RDATA5.

Referring to FIG. 4, for example, the second read operation on the first random data RDATA1 may be first completed, the second read operation on the second random data RDATA2 may be sequentially completed. Then, all first read operations on the first to fifth sequential data SDATA1 to SDATA5 may be completed, after which the second read operation on the third to fifth random data RDATA3 to RDATA5 may be sequentially completed. In this example, in the target memory block TMB, the first random data RDATA1, the second random data RDATA2, the first to fifth sequential data SDATA1 to SDATA5, and the third to fifth random data RDATA3 to RDATA5 may be sequentially stored.

As described above, in order to perform the read operation on the plurality of sequential data SDATA1 to SDATA5 more quickly, the plurality of sequential data SDATA1 to SDATA5 to be stored in the target memory block TMB may also be stored in the successive physical addresses mapped to the successive logical addresses from among the physical addresses of the target memory block TMB.

FIG. 5 is a diagram illustrating meta data stored in a meta data memory according to an embodiment of the present disclosure.

Referring to FIG. 5, a meta data MDATA may include a mapping information and a valid data information.

The mapping information may be information indicating a mapping relationship between the logical addresses LBA1 to LBA7 and the physical addresses PBA1 to PBA7.

Here, the physical addresses PBA1 to PBA7 may be physical addresses of the source memory block SMB.

The valid data information may be information indicating whether the data included in a plurality of memory blocks is valid or invalid.

As shown in FIG. 5, a sequential data may be valid data Valid having successive logical addresses LBA1 to LBA3 from among the plurality of logical addresses LBA1 to LBA7. However, embodiments of the disclosure are not limited to the embodiment illustrated in FIG. 5.

As shown in FIG. 5, a random data may be valid data Valid having a non-successive logical address LBAS from among the plurality of logical addresses LBA1 to LBA7. Alternatively, the random data may be valid data Valid having a non-successive logical address LBA7 from among the plurality of logical addresses LBA1 to LBA7. However, embodiments of the disclosure are not limited to the embodiment illustrated in FIG. 5.

Figure 6:
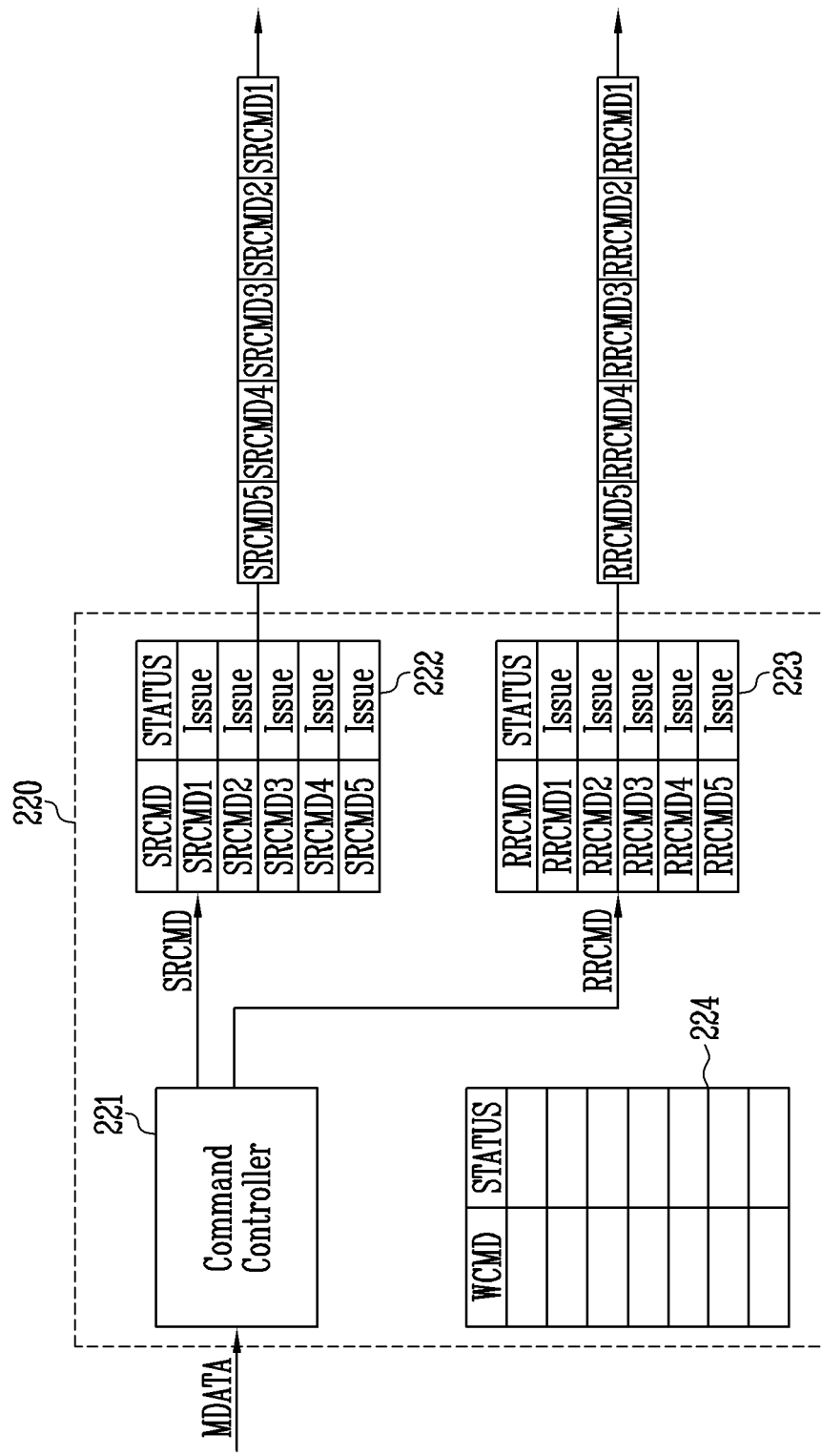
FIG. 6 is a diagram illustrating an embodiment in which a sequential read command and a random read command are provided to a memory device.

FIG. 6 is a diagram illustrating an embodiment in which a sequential read command and a random read command are provided to a memory device.

Referring to FIG. 6, a migration controller 220 may include a command controller 221, a first command queue 222, a second command queue 223, and a third command queue 224.

The command controller 221 may generate a sequential read command SRCMD and a random read command RRCMD based on a meta data MDATA. The meta data MDATA may include a valid data information and a mapping information. The sequential read command SRCMD may be a command that instructs reading of the sequential data (any one of SDATA1 to SDATA5) stored in a source memory block SMB. The random read command RRCMD may be a command that instructs reading of the random data (any one of RDATA1 to RDATA5) stored in the source memory block SMB.

Specifically, the command controller 221 may check validity of the data stored in the source memory block SMB using the valid data information. The command controller 221 may check a plurality of valid data having successive logical addresses from among the plurality of valid data as the sequential data SDATA1 to SDATA5 using the mapping information. The command controller 221 may check a plurality of valid data having non-successive logical address from among the plurality of valid data as the random data RDATA1 to RDATA5 using the mapping information. The command controller 221 may generate sequential read commands SRCMD1 to SRCMD5 instructing reading of the sequential data SDATA1 to SDATA5. The command controller 221 may generate random read commands RRCMD1 to RRCMD5 instructing reading of the random data RDATA1 to RDATA5.

In an embodiment, the first sequential read command SRCMD1 may be a command instructing reading of the first sequential data SDATA1, and the second sequential read command SRCMD2 may be a command instructing reading of the second sequential data SDATA2. Similarly, the third to fifth sequential read commands SRCMD3 to SRCMD5 may also be commands that instruct reading of the third to fifth sequential data SDATA3 to 5, respectively.

In an embodiment, the first random read command RRCMD1 may be a command instructing reading of the first random data RDATA1, and the second random read command RRCMD2 may be a command instructing reading of the second random data RDATA2. Similarly, the third to fifth random read commands RDATA3 to RDATA5 may also be commands that instruct reading of the third to fifth random data RDATA3 to RDATA5, respectively.

The command controller 221 may transfer the sequential read commands SRCMD1 to SRCMD5 to the first command queue 222 and may transfer the random read commands RRCMD1 to RRCMD5 to the second command queue 223.

The first command queue 222 may receive the sequential read commands SRCMD1 to SRCMD5 from the command controller 221 and provide the sequential read commands SRCMD1 to SRCMD5 to the memory device 100.

In an embodiment, the sequential read commands SRCMD1 to SRCMD5 stored in the first command queue 222 may be provided to the memory device 100 in an order in which the sequential read commands SRCMD1 to SRCMD5 are input to the first command queue 222. Referring to FIG. 6, for example, the sequential read commands SRCMD1 to SRCMD5 may be input to the first command queue 222 in an order of the first sequential read command SRCMD1, the second sequential read command SRCMD2, the third sequential read command SRCMD3, the fourth sequential read command SRCMD4, and the fifth sequential read command SRCMD5. In this case, the sequential read commands SRCMD1 to SRCMD5 stored in the first command queue 222 may be provided to the memory device 100 in the same order as the input order. That is, the sequential read commands SRCMD1 to SRCMD5 stored in the first command queue 222 may be provided to the memory device 100 in a first in first out method.

In an embodiment, a process status STATUS of each of the sequential read commands SRCMD1 to SRCMD5 stored in the first command queue 222 may be a provision status Issue. The provision status Issue may mean a status in which the read command is provided to the memory device 100.

Although not shown, a tail address may be given to the first sequential read command SRCMD1 stored in the first command queue 222, and a head address may be given to the fifth sequential read command SRCMD5 stored in the first command queue 222.

The second command queue 223 may receive the random read commands RRCMD1 to RRCMD5 from the command controller 221 and provide the random read commands RRCMD1 to RRCMD5 to the memory device 100.

In an embodiment, the random read commands RRCMD1 to RRCMD5 stored in the second command queue 223 may be provided to the memory device 100 in an order in which the random read commands RRCMD1 to RRCMD5 are input to the second command queue 223. Referring to FIG. 6, for example, the random read commands RRCMD1 to RRCMD5 may be input to the second command queue 223 in an order from the first random read command RRCMD1 to the fifth random read command RRCMD5. In this case, the random read commands RRCMD1 to RRCMD5 stored in the second command queue 223 may be provided to the memory device 100 in the same order as the input order. That is, the random read commands RRCMD1 to RRCMD5 stored in the second command queue 223 may be provided to the memory device 100 in a first in first out method.

In an embodiment, a process status STATUS of each of the random read commands RRCMD1 to RRCMD5 stored in the second command queue 223 may be a provision status Issue.

The command controller 221 may provide a random write command (not shown) to the third command queue 224. Alternatively, the command controller 221 may provide a sequential write command (not shown) to the third command queue 224. A detailed description thereof is described below with reference to FIGS. 7 and 8.

Figure 7:
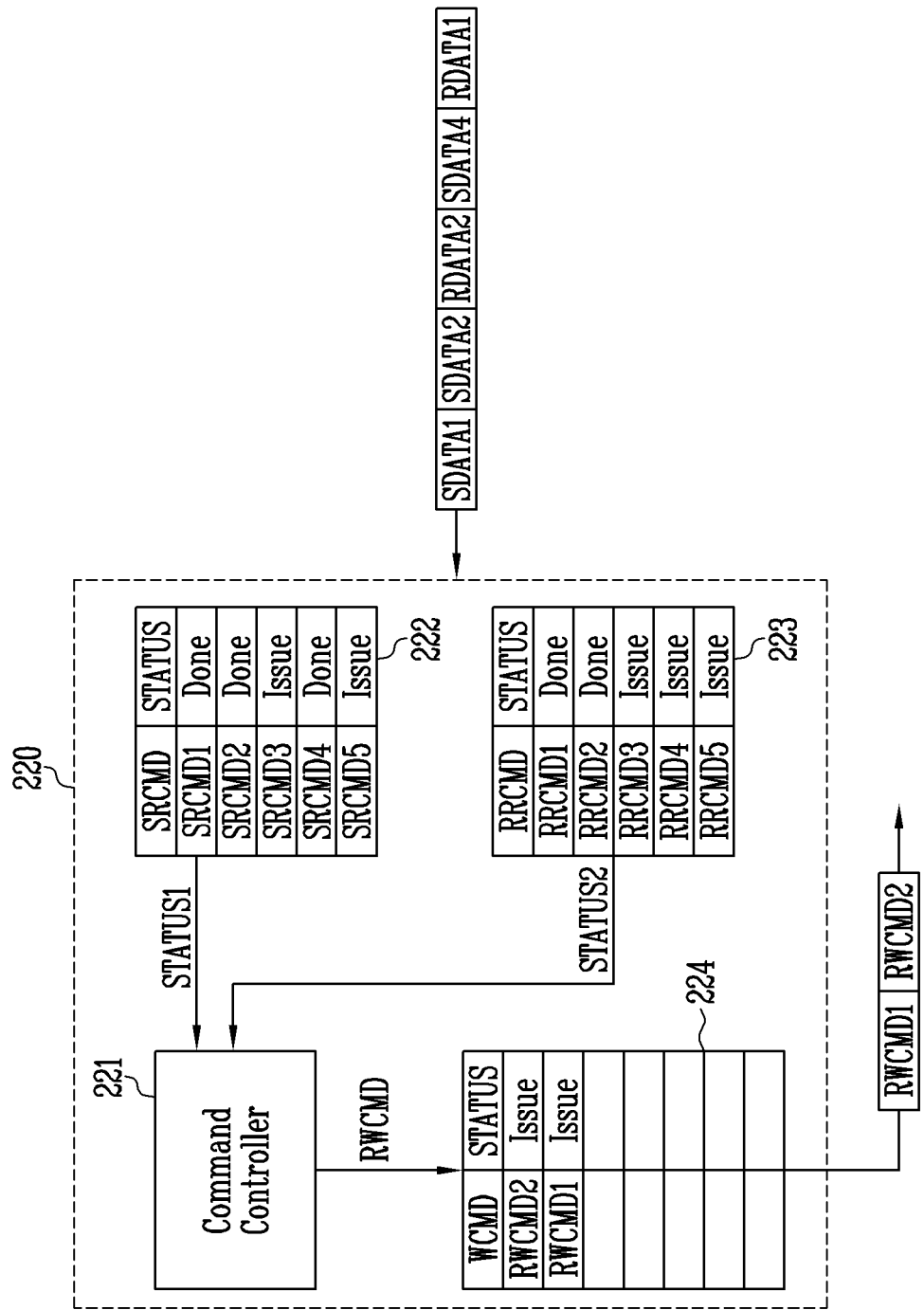
FIG. 7 is a diagram illustrating an embodiment in which a random write command is provided to a memory device.

FIG. 7 is a diagram illustrating an embodiment in which a random write command is provided to a memory device.

Referring to FIGS. 1 and 7, a memory device 100 may sequentially provide valid data, on which a read operation is completed among a sequential data SDATA1 to SDATA5 and a random data RDATA1 to RDATA5, to the migration controller 220.

Referring to FIG. 7, for example, a read operation is completed in an order of the first sequential read command SRCMD1, the second sequential read command SRCMD2, the second random read command RRCMD2, the fourth sequential read command SRCMD4, and the first random read command RRCMD1. In this case, the first sequential data SDATA1, the second sequential data SDATA2, the second random data RDATA2, the fourth sequential data SDATA4, and the first random data RDATA1 may be sequentially provided to the migration controller 220.

The process statuses STATUS of the sequential read commands SRCMD1 to SRCMD5 stored in the first command queue 222 may be changed according to whether the sequential data is provided to the migration controller 220.

Referring to FIG. 7, for example, when the first sequential data SDATA1 is provided to the migration controller 220, the process status STATUS of the first sequential read command SRCMD1 stored in the first command queue 222 may be changed from the provision status Issue to a completion status Done. Similarly, when the second and fourth sequential data SDATA2 and SDATA4 are provided to the migration controller 220, the process status STATUS of the second and fourth sequential read commands SRCMD2 and SRCMD4 stored in the first command queue 222 may also be changed from the provision status Issue to the completion status Done. Here, the completion status Done may be a status in which the read operation on the valid data is completed. When the read operation is completed, the valid data may be provided to the migration controller 220.

The process statuses STATUS of the random read commands RRCMD1 to RRCMD5 stored in the second command queue 223 may be changed according to whether the random data is provided to the migration controller 220.

Referring to FIG. 7, for example, when the first and second random data RDATA1 and RDATA2 are provided to the migration controller 220, the process status STATUS of the first and second random read commands RRCMD1 and RRCMD2 may be changed from the provision status Issue to the completion status Done.

In an embodiment, the command controller 221 may obtain sequential data of a sequential read command, from among the sequential read commands SRCMD1 to SRCMD5, for which the first read operation is completed. The command controller 221 may determine whether all first read operations on the sequential read commands SRCMD1 to SRCMD5 are completed based on the process status STATUS stored in the first command queue 222. When all first read operations on the sequential read commands SRCMD1 to SRCMD5 are completed, the command controller 221 may generate the sequential write command SWCMD. The sequential write command SWCMD may be a command instructing storing of the sequential data in the target memory block TMB.

However, as shown in FIG. 7, only the process statuses of the first, second, and fourth sequential read commands SRCMD1, SRCMD2, and SRCMD4, from among the sequential read commands SRCMD1 to SRCMD5, may have the completion status Done. Consequently, the command controller 221 may not generate the sequential write command SWCMD because all first read operations on the sequential read commands SRCMD1 to SRCMD5 are not completed.

In an embodiment, the command controller 221 may generate the random write command RWCMD in an order in which the second read operation on the random read commands RRCMD1 to RRCMD5 is completed. The order in which the second read operation is completed may be determined based on the process status STATUS stored in the second command queue 223. That is, the order in which the second read operation is completed may be an order in which the process status STATUS stored in the second command queue 223 is changed to the completion status Done.

In an embodiment, the first random write command RWCMD1 may be a command instructing storing of the first random data RDATA1 in the target memory block TMB, and the second random write command RWCMD2 may be a command instructing to store the second random data RDATA2 in the target memory block TMB.

In an embodiment, when the second read operation is completed, the command controller 221 may obtain the random data, and thus the command controller 221 may generate the random write command RWCMD in the order in which the random data is obtained by the second read operation.

Referring to FIG. 7, for example, after the second random data RDATA2 is obtained, the first random data RDATA1 is obtained. The command controller 221 may not generate the sequential write commands (not shown) for the first and second sequential data SDATA1 and SDATA2 obtained before the second random data RDATA2 is obtained, and may sequentially generate the second random write command RWCMD2 and the first random write command RWCMD1.

The command controller 221 may provide the random write command RWCMD to the third command queue 224.

The third command queue 224 may receive the random write command RWCMD and provide the random write command RWCMD to the memory device 100. As described above, the random write commands RWCMD stored in the third command queue 224 may be provided to the memory device 100 in a first in first out method.

Referring to FIG. 7, for example, the third command queue 224 sequentially receives the second random write command RWCMD2 and the first random write command RWCMD1 from the command controller 221. In addition, the second random write command RWCMD2 and the first random write command RWCMD1 stored in the third command queue 224 are sequentially provided to the memory device 100.

Figure 8:
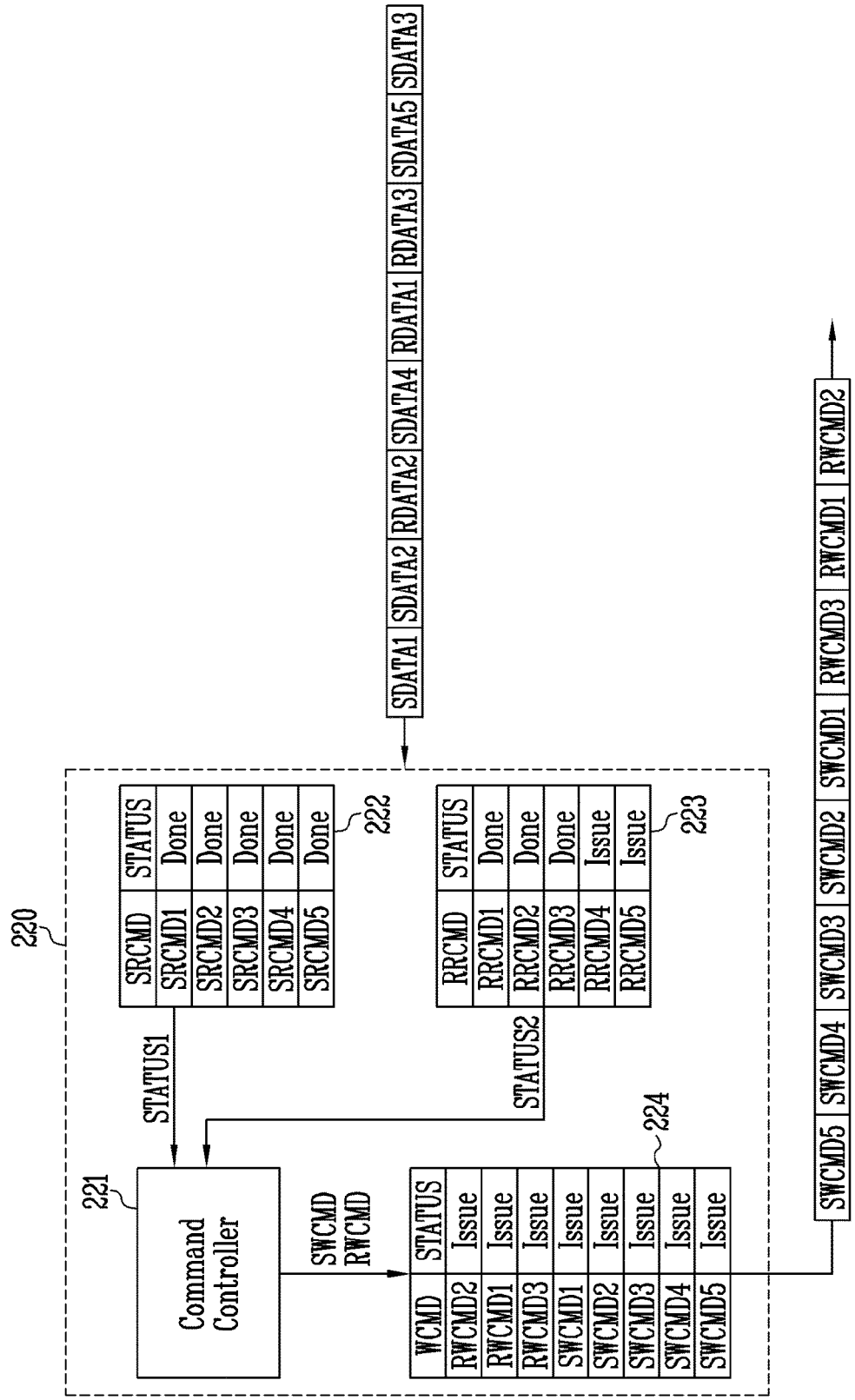
FIG. 8 is a diagram illustrating an embodiment in which a random write command and a sequential write command are provided.

FIG. 8 is a diagram illustrating an embodiment in which a random write command and a sequential write command are provided.

Referring to FIG. 8, the first sequential data SDATA1, the second sequential data SDATA2, the second random data RDATA2, the fourth sequential data SDATA4, the first random data RDATA1, the third random data RDATA3, the fifth sequential data SDATA5, and the third sequential data SDATA3 may be sequentially provided to the migration controller 220.

Referring to FIG. 8, for example, all process statuses of the sequential read commands SRCMD1 to SRCMD5 stored in the first command queue 222 may be changed from the provision status Issue to the completion status Done. Here, an order in which the process statuses of the sequential read commands SRCMD1 to SRCMD5 are changed to the completion state Done may be determined according to an order in which the first to fifth sequential data SDATA1 to SDATA5 are obtained.

Referring to FIG. 8, for example, process statuses of the first to third random read commands RRCMD1 to RRCMD3 stored in the second command queue 223 may be changed from the provision status Issue to the completion status Done. Here, an order in which the process statuses of the stored first to third random read commands RRCMD1 to RRCMD3 are changed to the completion status Done may be determined according to an order in which the first to third random data RDATA1 to 3 are obtained.

Similar to that described above with reference to FIG. 7, in an embodiment, even though the second random data RDATA2 is obtained later than the first and second sequential data SDATA1 and SDATA2, the command controller 221 may first generate the second random write command RWCMD2 and transfer the second random write command RWCMD2 to the third command queue 224.

In an embodiment, even though the first and third random data RDATA1 and RDATA3 are obtained later than the fourth sequential data SDATA4, the command controller 221 may sequentially generate the first and third random write commands RWCMD1 and RWCMD3 after the second random write command RWCMD2 is generated, and may sequentially transfer the first and third random write commands RWCMD1 and RWCMD3 to the third command queue 224.

As shown in FIG. 8, when the third sequential data SDATA3 is finally obtained, all process statuses STATUS of the sequential read commands SRCMD1 to SRCMD5 may be in the completion status Done. The command controller 221 may determine that all first read operations on the sequential read commands SRCMD1 to SRCMD5 are completed. The command controller 221 may generate the sequential write commands SWCMD1 to SWCMD5 in the order in which the sequential read commands SRCMD1 to SRCMD5 are input to the first command queue 222.

The command controller 221 may transfer the sequential write commands SWCMD1 to SWCMD5 to the third command queue 224 in the order in which the sequential read commands SRCMD1 to SRCMD5 are input to the first command queue 222.

The third command queue 224 may store the write commands in an order in which the command controller 221 transfers the sequential write commands SWCMD and the random write commands RWCMD.

Referring to FIG. 8, for example, the third command queue 224 may store the write commands in an order of the second random write command RWCMD2, the first random write command RWCMD1, the third random write command RWCMD3, and the sequential write commands SWCMD1 to SWCMD5.

The third command queue 224 may provide the write command to the memory device 100 in an order in which the third command queue 244 receives the sequential write commands SWCMD and the random write commands RWCMD.

Referring to FIG. 8, for example, the third command queue 224 may sequentially provide the second random write command RWCMD2, the first random write command RWCMD1, the third random write command RWCMD3, and the sequential write commands SWCMD1 to SWCMD5 to the memory device 100.

As described above, during the migration operation, a continuity of the sequential data is maintained, and thus there is an effect of improving a speed of the read operation on the sequential data.

Figure 9:
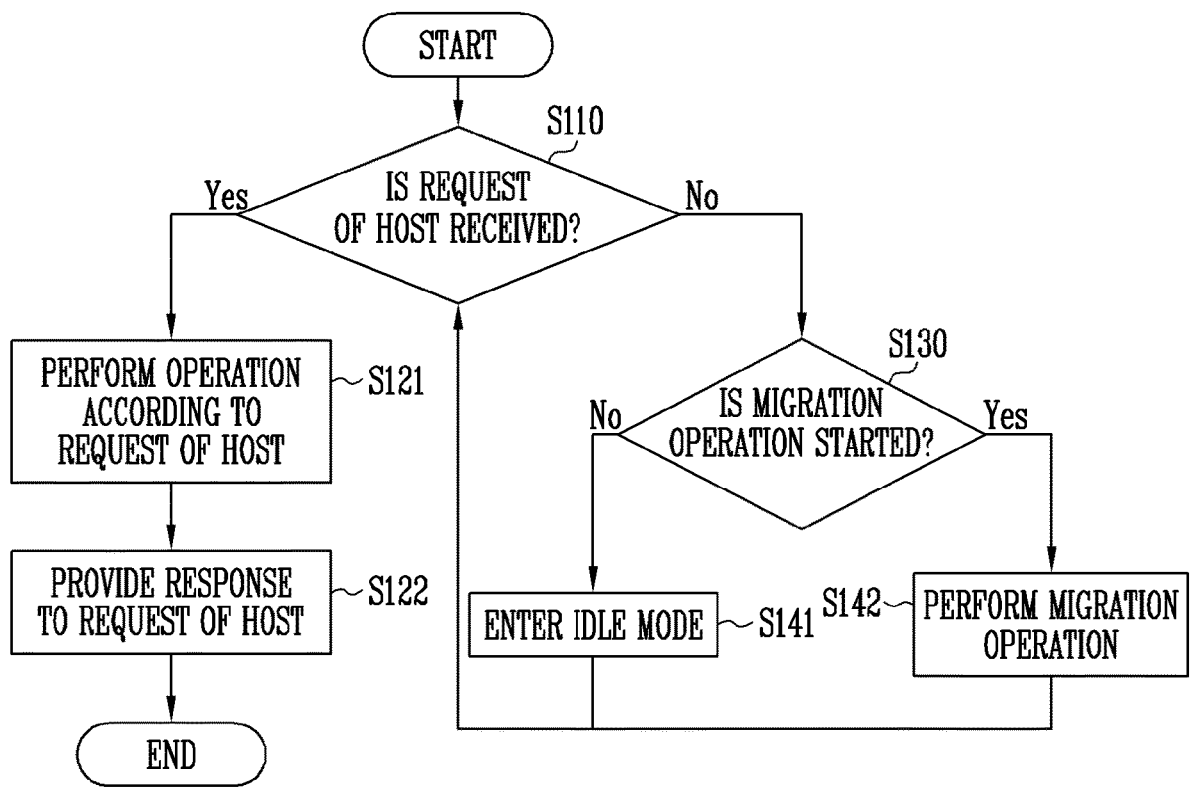
FIG. 9 is a flowchart illustrating a method of operating a storage device according to an embodiment of the present disclosure.

FIG. 9 is a flowchart illustrating a method of operating a storage device according to an embodiment of the present disclosure.

Referring to FIG. 9, a storage device 1000 may determine whether a request of a host 400 is received (S110).

When the request of the host 400 is received (S110, YES), the storage device 1000 may perform an operation according to the request of the host 400 (S121), and provide the response to the request of the host 400 to the host 400 (S122).

For example, the storage device 1000 performs a program operation in response to a write request of the host 400 and provides a response informing that the program operation is completed to the host 400.

In another example, the storage device 1000 performs a read operation in response to a read request of the host 400 and provides a read data to the host 400 in response to the read request.

When the request of the host 400 is not present (S110, No), the storage device 1000 determines whether to start a migration operation in performing a background operation (S130).

When the migration operation is not started (S130, No), the storage device 1000 enters an idle mode (S141). The idle mode may be a mode that waits until a request of the host 400 is received without performing the background operation.

When the migration operation is started (S130, Yes), the storage device 1000 performs the migration operation (S142).

For example, the migration controller 220 may control the memory device to perform the migration operation within a period corresponding to a period after a response is provided to the host 400 until a subsequent request of the host 400 is received.

Figure 10:
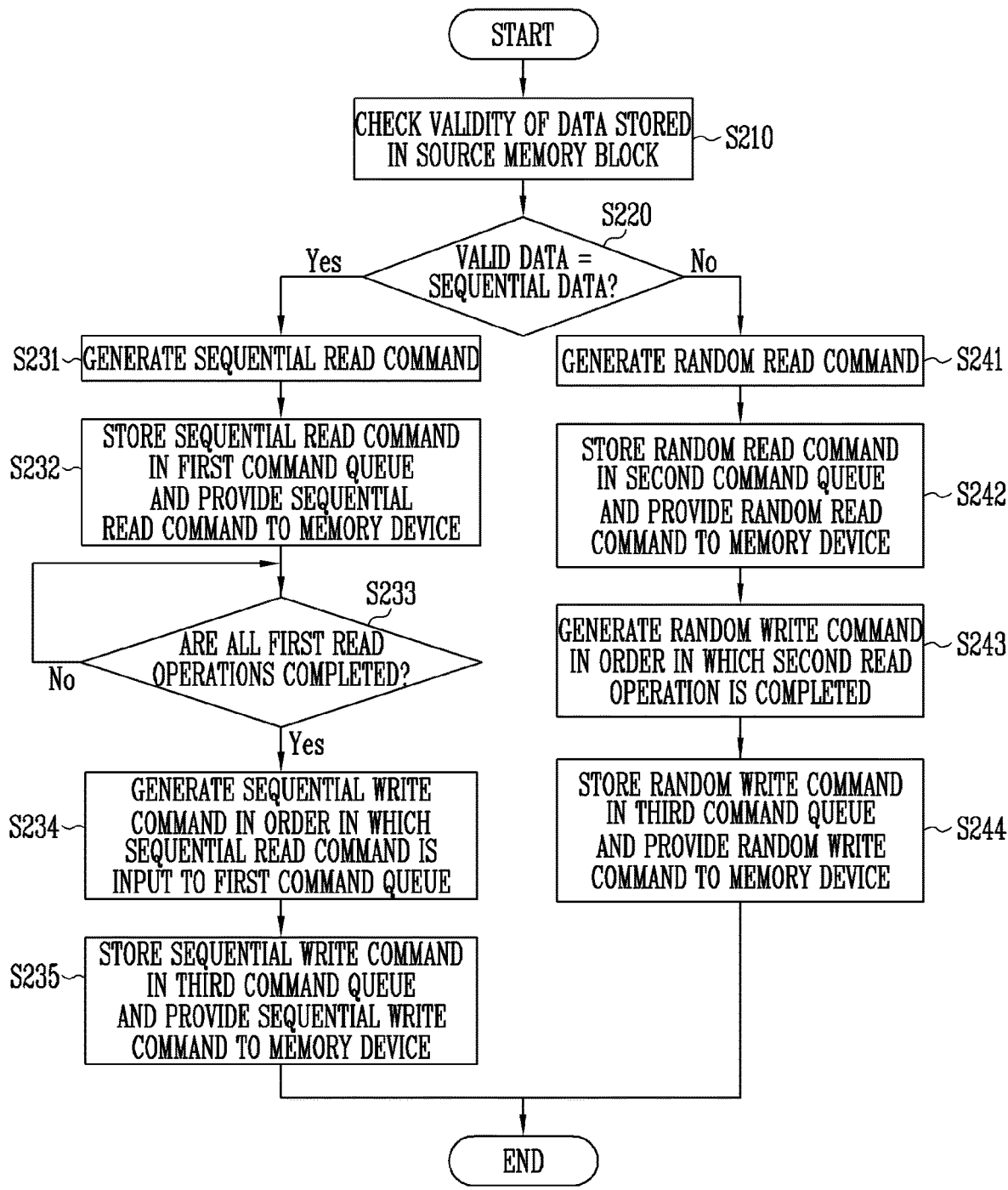
FIG. 10 is a flowchart illustrating a method of operating a memory controller according to an embodiment of the present disclosure.

FIG. 10 is a flowchart illustrating a method of operating a memory controller according to an embodiment of the present disclosure.

Referring to FIG. 10, a memory controller 200 according to an embodiment of the present disclosure checks the validity of a data stored in a source memory block SMB using a valid data information (S210).

The memory controller 200 determines whether a valid data included in the source memory block SMB is a sequential data (for example, SDATA1 to SDATA5) using a mapping information (S220).

The sequential data may be the valid data having successive logical addresses from among a plurality of valid data stored in the source memory block SMB.

When the valid data is the sequential data (S220, Yes), the memory controller 200 generates a sequential read command (for example, SRCMD1 to SRCMD5) (S231), stores the sequential read command in a first command queue 222, and provides the sequential read command to a memory device 100 (S232).

The memory controller 200 determines whether all first read operations on the sequential data are completed (S233).

When all first read operations are completed (S233, Yes), the memory controller 200 generates a sequential write command (for example, SWCMD1 to SWCMD5) in the order in which the sequential read command is input to the first command queue 222 (S234), stores the sequential write command in a third command queue 224, and provides the sequential write command to the memory device 100 (S235).

When the valid data is a random data (for example, RDATA1 to RDATA5) (S220, No), the memory controller 200 generates a random read command (for example, RRCMD1 to RRCMD5) (S241), stores the random read command in a second command queue 223, and provides the random read command to the memory device 100 (S242).

The random data may be a valid data, but not a sequential data, from among the plurality of valid data stored in the source memory block SMB.

The memory controller 200 generates a random write command (for example, RWCMD1 to RWCMD3) in the order in which a second read operation is completed (S243), stores the random write command in the third command queue 224, and provides the random write command to the memory device 100 (S244).

Figure 11:
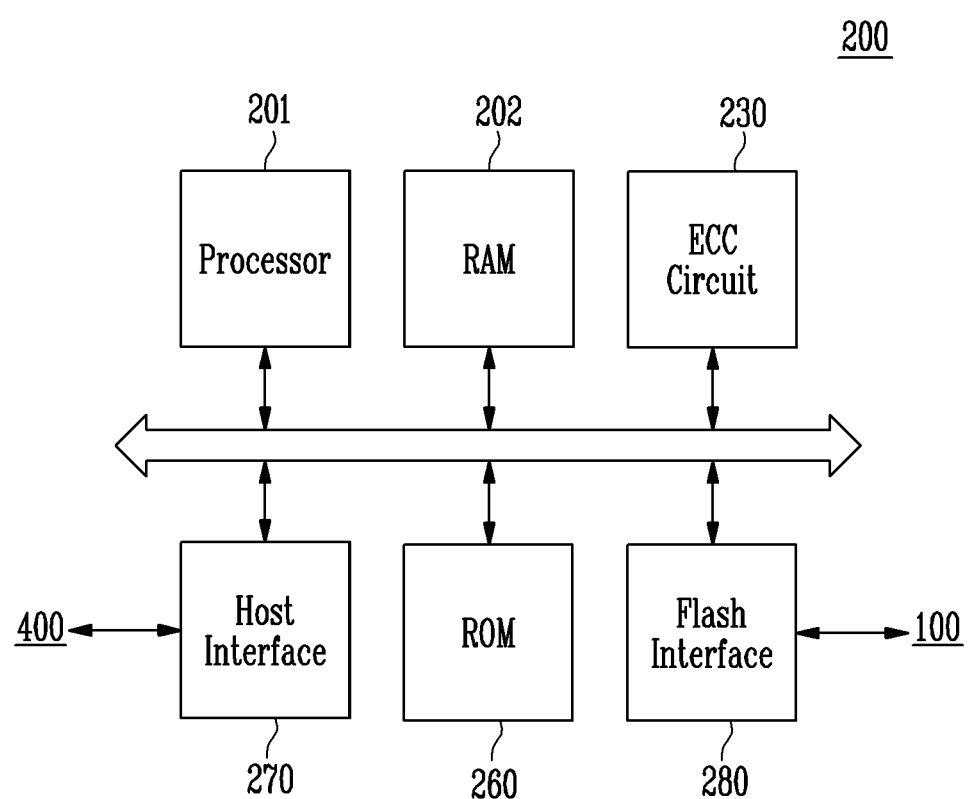
FIG. 11 is a diagram illustrating a memory controller according to an embodiment of the present disclosure.

FIG. 11 is a diagram illustrating a memory controller according to an embodiment of the present disclosure.

Referring to FIGS. 1 and 11, the memory controller 200 may include a processor 201, a RAM 202, an error correction circuit ECC Circuit 230, a ROM 260, a host interface 270, and a flash interface 280.

The processor 201 may control an overall operation of the memory controller 200.

The RAM 202 may be used as a buffer memory, a cache memory, an operation memory, and the like of the memory controller 200. For example, the buffer memory may be the RAM 202, and in an embodiment, the buffer memory may be an SRAM.

The ROM 260 may store various information required for the memory controller 200 to operate in a firmware form.

The memory controller 200 may communicate with an external device (for example, the host 400, an application processor, and the like) through the host interface 270.

The memory controller 200 may communicate with the memory device 100 through the flash interface 280. The memory controller 200 may transmit a command CMD, an address ADD, a control signal CTRL, and the like to the memory device 100, and receive data DATA, through the flash interface 280.

For example, the flash interface 280 may include a NAND interface.

Figure 12:
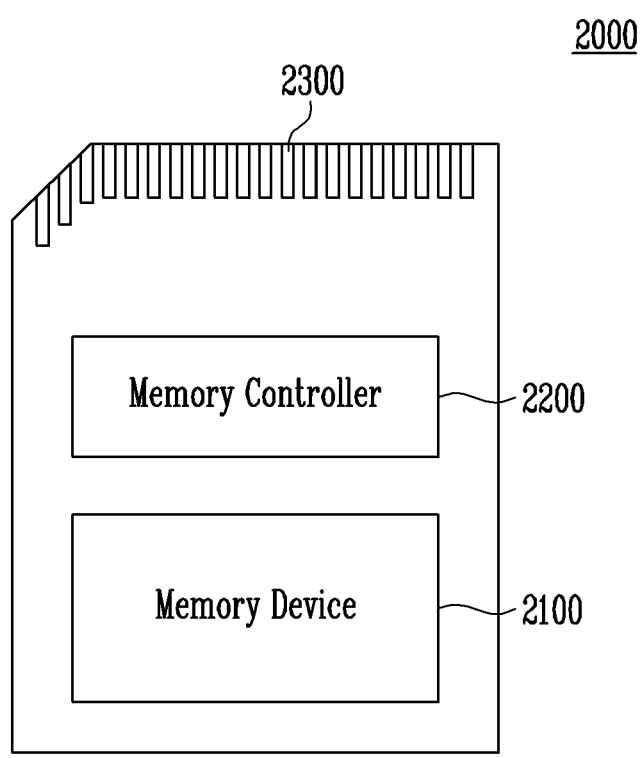
FIG. 12 is a block diagram illustrating a memory card system to which a storage device according to an embodiment of the present disclosure is applied.

FIG. 12 is a block diagram illustrating a memory card system to which a storage device according to an embodiment of the present disclosure is applied.

Referring to FIGS. 1 and 12, the memory card system 2000 includes a memory device 2100, a memory controller 2200, and a connector 2300.

For example, the memory device 2100 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetoresistive RAM (STT-MRAM).

The memory controller 2200 is connected to the memory device 2100. The memory controller 2200 is configured to access the memory device 2100. For example, the memory controller 2200 may be configured to control read, write, erase, and background operations of the memory device 2100. The memory controller 2200 is configured to provide an interface between the memory device 2100 and the host 400. The memory controller 2200 is configured to drive firmware for controlling the memory device 2100. The memory controller 2200 may be implemented equally to the memory controller 200 described with reference to FIG. 1.

For example, the memory controller 2200 may include components such as a random access memory (RAM), a processor, a host interface, a memory interface, and an error correction circuit.

The memory controller 2200 may communicate with an external device through the connector 2300. The memory controller 2200 may communicate with an external device (for example, the host 400) according to a specific communication standard. For example, the memory controller 2200 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

The memory device 2100 and the memory controller 2200 may be integrated into one semiconductor device to configure a memory card. For example, the memory controller 2200 and the memory device 2100 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
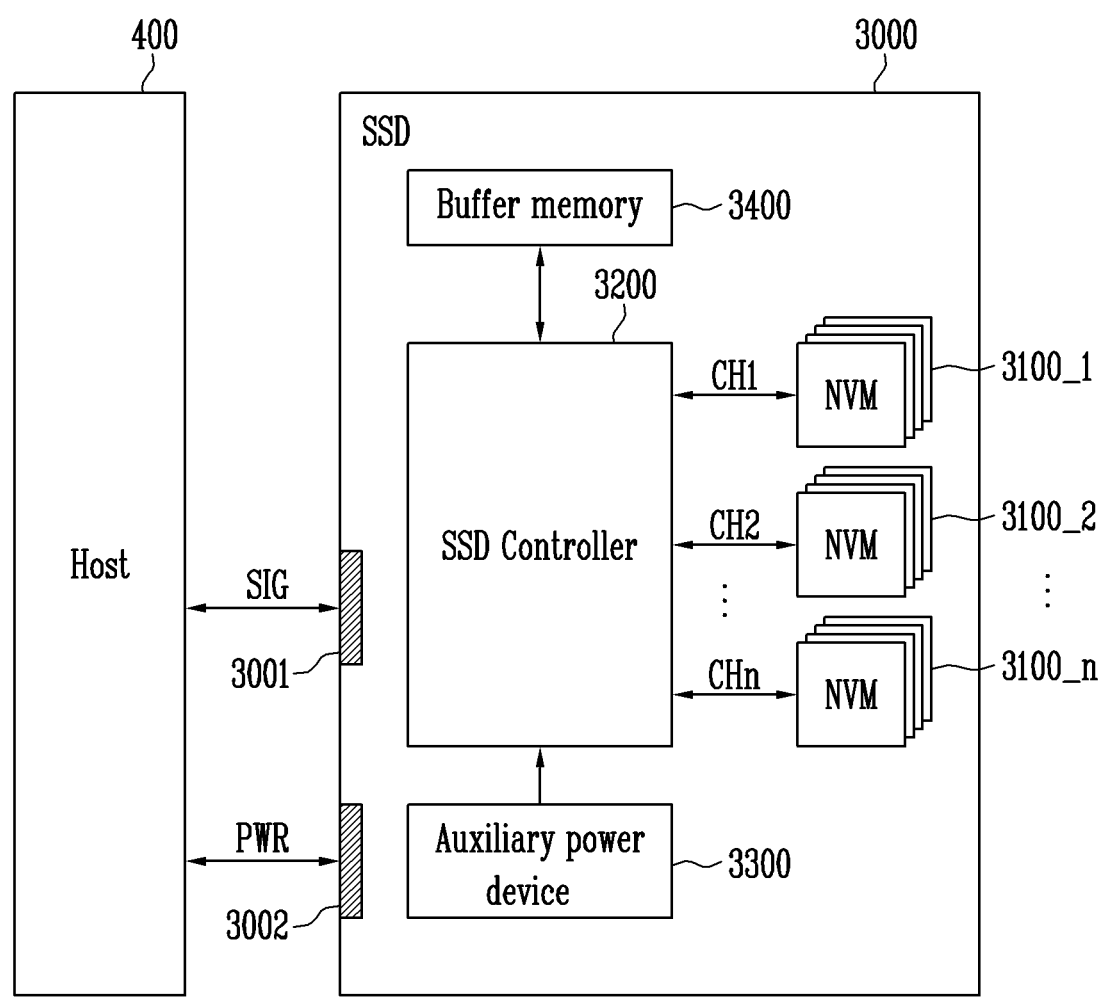
FIG. 13 is a block diagram illustrating a solid state drive (SSD) system to which a storage device according to an embodiment of the present disclosure is applied.

FIG. 13 is a block diagram illustrating a solid state drive (SSD) system to which a storage device according to an embodiment of the present disclosure is applied.

Referring to FIGS. 1 and 13, the SSD system includes the host 400 and an SSD 3000.

The SSD 3000 exchanges a signal SIG with the host 400 through a signal connector 3001 and receives power PWR through a power connector 3002. The SSD 3000 includes an SSD controller 3200, a plurality of flash memories 3100_1, 3100_2, to 3100_$n$ (where n is a positive integer), an auxiliary power device 3300, and a buffer memory 3400.

According to an embodiment of the present disclosure, the SSD controller 3200 may perform the function of the memory controller 200 described with reference to FIG. 1.

The SSD controller 3200 may control the plurality of flash memories 3100_1, 3100_2, to 3100_$n$ (where n is a positive integer) in response to the signal SIG received from the host 400. For example, the signal SIG may be signals based on an interface between the host 400 and the SSD 3000. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3300 is connected to the host 400 through the power connector 3002. The auxiliary power device 3300 may receive the power PWR from the host 400 and may charge the power. The auxiliary power device 3300 may provide power of the SSD 3000 when power supply from the host 400 is not smooth. For example, the auxiliary power device 3300 may be positioned in the SSD 3000 or may be positioned outside the SSD 3000. For example, the auxiliary power device 3300 may be positioned on a main board and may provide auxiliary power to the SSD 3000.

The buffer memory 3400 may temporarily store data. For example, the buffer memory 3400 may temporarily store data received from the host 400 or data received from the plurality of flash memories 3100_1, 3100_2, to 3100_$n$ (where n is a positive integer), or may temporarily store meta data (for example, a mapping table) of the flash memories 3100_1, 3100_2, to 3100_$n$ (where n is a positive integer). The buffer memory 3400 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 14:
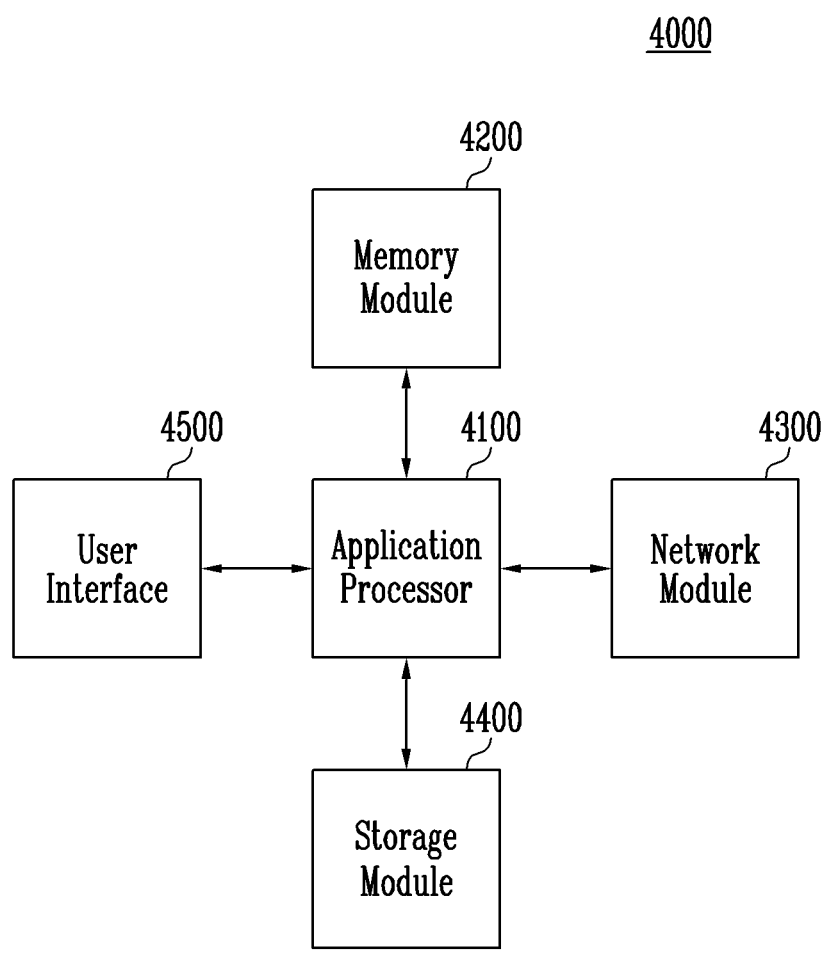
FIG. 14 is a block diagram illustrating a user system to which a storage device according to an embodiment of the present disclosure is applied.

FIG. 14 is a block diagram illustrating a user system to which a storage device according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may operate identically to the storage device 1000 described with reference to FIG. 1. The storage module 4400 may include a plurality of non-volatile memory devices, and the plurality of non-volatile memory devices may operate identically to the memory device 100 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

As described above, according to embodiments of the present disclosure, there is an effect of improving a speed of reading valid data having successive logical addresses.

What is claimed is:

1. A memory controller that controls a memory device including a plurality of memory blocks, the memory controller comprising:
a meta data memory configured to store mapping information of a data stored in the plurality of memory blocks and valid data information indicating whether the data stored in the plurality of memory blocks is valid data; and
a migration controller configured to control the memory device to perform a migration operation of moving a plurality of valid data stored in a source memory block to a target memory block based on the mapping information and the valid data information,
wherein the migration controller is configured to control the memory device to:
read, from among the plurality of valid data stored in the source memory block, i) a sequential data that is a valid data having successive logical addresses and ii) a random data that is a valid data having a non-successive logical address,
order, from among a plurality of random data, the sequential data based on when all first read operations on the sequential data are completed, and
store the sequential data sequentially in the target memory block when all the first read operations on the sequential data are completed.

2. The memory controller of claim 1, wherein the migration controller controls the memory device to store the random data in the target memory block in an order in which a second read operation on the random data is completed.

3. The memory controller of claim 1, wherein the migration controller comprises:
a command controller configured to generate, based on the mapping information and the valid data information, a sequential read command instructing reading the sequential data and a random read command instructing reading the random data;
a first command queue configured to receive the sequential read command from the command controller and to provide the sequential read command to the memory device; and
a second command queue configured to receive the random read command from the command controller and to provide the random read command to the memory device.

4. The memory controller of claim 3, wherein the command controller generates a sequential write command instructing storing the sequential data in the target memory block in an order in which the sequential read command is input to the first command queue, and
the command controller generates a random write command instructing storing the random data in the target memory block in an order in which the random data is obtained by the second read operation.

5. The memory controller of claim 4, further comprising:
a third command queue configured to receive the sequential write command and the random write command from the command controller and to provide the sequential write command and the random write command to the memory device.

6. The memory controller of claim 1, wherein the source memory block is a victim block selected during a garbage collection operation from among the plurality of memory blocks, and
the target memory block is a free block among the plurality of memory blocks.

7. The memory controller of claim 6, wherein the victim block is a memory block in which the sequential data, having a size less than or equal to a preset reference size is stored.

8. The memory controller of claim 1, wherein the migration controller controls the memory device to perform the migration operation within a period corresponding to a time after a response, to a request provided by a host is provided to the host until a subsequent request to be provided by the host is received.

9. A method of operating a memory controller that controls a memory device including a plurality of memory blocks, the method comprising:

providing a read command, to read a sequential data and a random data stored in a source memory block among the plurality of memory blocks to the memory device, based on i) mapping information of a data stored in the plurality of memory blocks and ii) valid data information indicating whether the data stored in the plurality of memory blocks is a valid data;

providing a sequential write command to write the sequential data to the memory device in response to completion of all first read operations on the sequential data;

providing a random write command to write the random data to the memory device in an order in which a second read operation on the random data is completed; and ordering the sequential write command, among the random write command, based on completion of all the first read operations on the sequential data, wherein the sequential write command is a command for instructing storing the sequential data in a target memory block among the plurality of memory blocks so that the sequential data is simultaneously read in the target memory block.

10. The method of claim 9, wherein providing the read command to the memory device comprises:

generating, based on the mapping information and the valid data information, a sequential read command and a random read command;

storing the sequential read command in a first command queue and providing the sequential read command to the memory device; and storing the random read command in a second command queue and providing the random read command to the memory device.

11. The method of claim 10, wherein providing the sequential write command to the memory device comprises:

generating the sequential write command in an order in which the sequential read command is input to the first command queue; and storing the sequential write command in a third command queue and providing the sequential write command to the memory device.

12. The method of claim 10, wherein providing the random write command to the memory device comprises:

generating the random write command instructing storing the random data in the target memory block in an order in which the random data is obtained by the second read operation; and storing the random write command in a third command queue and providing the random write command to the memory device.

13. The method of claim 9, wherein the source memory block is a victim block selected during a garbage collection operation from among the plurality of memory blocks, and the target memory block is a free block among the plurality of memory blocks.

14. The method of claim 13, wherein the victim block is a memory block in which the sequential data having a size less than or equal to a preset reference size is stored.

15. The method of claim 9, wherein the sequential data is valid data having successive logical addresses among a plurality of valid data stored in the source memory block, and the random data is valid data except for the sequential data among the plurality of valid data stored in the source memory block.

\* \* \* \* \*